United States Patent [19]

Asano et al.

[11] Patent Number: 4,847,361

[45] Date of Patent: Jul. 11, 1989

[54] PROCESS FOR PREPARING PELLETS OF HYDROLYZED ETHYLENE-VINYL ACETATE COPOLYMER

[75] Inventors: Kuniyoshi Asano; Yasunori Miyamoto, both of Kurashiki, Japan

[73] Assignee: Nippon Gohsei Kagaku Kogyo Kabushiki Kaisha, Osaka, Japan

[21] Appl. No.: 161,402

[22] Filed: Feb. 22, 1988

Related U.S. Application Data

[63] Continuation of Ser. No. 927,233, Nov. 5, 1986, abandoned.

[30] Foreign Application Priority Data

Nov. 5, 1985 [JP] Japan ................. 60-247715

[51] Int. Cl.$^4$ ............................. C08F 6/06; C08F 8/12
[52] U.S. Cl. .................... 528/494; 528/491; 528/497; 525/60; 264/178 R; 264/331.15
[58] Field of Search ............... 528/491, 494, 497; 525/60; 264/178 R, 331.15, 331.18

[56] References Cited

U.S. PATENT DOCUMENTS

| | | | |
|---|---|---|---|
| 3,102,775 | 9/1963 | Seeger | 525/62 X |
| 3,562,234 | 2/1971 | Resz et al. | 525/62 |
| 3,847,845 | 11/1974 | Tada et al. | 525/61 X |
| 3,925,336 | 12/1975 | Sawada | 525/62 |
| 4,119,687 | 10/1978 | Resz et al. | 525/62 X |
| 4,265,799 | 5/1981 | McClain | 525/62 X |
| 4,547,329 | 10/1985 | Dombroski et al. | 264/331.15 X |

OTHER PUBLICATIONS

Toyoshima, "General Properties of Polyvinyl Alcohol in Relation to its Applications" in Polyvinyl Alcohol, Finch (ed.), Wiley–Interscience (1973), pp. 39–40.

*Primary Examiner*—Joseph L. Schofer
*Assistant Examiner*—F. M. Teskin
*Attorney, Agent, or Firm*—Antonelli, Terry & Wands

[57] ABSTRACT

A process for preparing pellets of a hydrolyzed ethylene-vinyl acetate copolymer which comprises extruding a solution of a hydrolyzed ethylene-vinyl acetate copolymer in methanol or a mixture of water and methanol into a coagulating liquid in the form of a strand, and cutting the strand into pellets, the coagulating liquid consisting essentially of an organic solvent having a boiling point of not more than 100° C., and being compatible with methanol but not being capable of dissolving the hydrolyzed ethylene-vinyl acetate copolymer. According to the present invention, the pellets from which impurities such as sodium acetate can be efficiently removed, and which have excellent thermal stability and moldability can be obtained in high productivity.

4 Claims, No Drawings

PROCESS FOR PREPARING PELLETS OF HYDROLYZED ETHYLENE-VINYL ACETATE COPOLYMER

This application is a continuation of application Ser. No. 927,233 filed Nov. 5, 1986, abandoned.

BACKGROUND OF THE INVENTION

The present invention relates to a process for preparing pellets of hydrolyzed ethylene-vinyl acetate copolymers, and more particularly to a process for preparing hydrolyzed ethylene-vinyl acetate copolymer pellets which have excellent thermal stability and moldability and from which impurities such as sodium acetate can be efficiently removed.

Hydrolyzed ethylene-vinyl acetate copolymers are widely employed for various uses such as films, sheets, containers and fibers since the hydrolyzed copolymers are excellent in properties such as oxygen-barrier property, solvent resistance and mechanical strength.

Generally, hydrolyzed ethylene-vinyl acetate copolymers are prepared by hydrolyzing ethylene-vinyl acetate copolymers with alkali catalysts such as sodium hydroxide. After hydrolysis reaction, a large portion of the alkali catalysts such as sodium hydroxide are converted into alkali metal salts of acetic acid such as sodium acetate, and the salts are included in resins deposited or coagulated from the hydrolysis reaction mixtures.

The impurities such as sodium acetate affect adversely properties of hydrolyzed copolymers, e.g. the coloration of the hydrolyzed copolymer occurs, the moldability lowers, and the like. Therefore, it is necessary to remove impurities such as sodium acetate from hydrolyzed copolymers as far as possible.

On the other hand, when molded articles such as films and sheets are prepared from hydrolyzed copolymers by melt-molding, the hydrolyzed copolymers are required to be formed into pellets from the point of handling or molding processability. Accordingly, it is desired that the hydrolyzed copolymer pellets having the remarkably decreased contents of the alkali metal salts of acetic acid and having excellent thermal stability and moldability are prepared and supplied into the market.

For instance, Japanese Examined Patent Publication No. 38634/1972 discloses a process for preparing pellets of hydrolyzed ethylene-vinyl acetate copolymers which comprises extruding hydrolyzed ethylene-vinyl acetate copolymers in the mixture of water and methanol into coagulating liquids of water or the mixture of water and methanol in the form of strands, and cutting the strand into pellets.

The above-mentioned process has merits that porous pellets from which sodium acetate can be removed to small amount by washing them with water can be obtained and the loss of resin in the preparation of pellets is relatively small, but the process has the following deffects.

(1) A large amount of wash water is required for removing sodium acetate from the pellets to such an extent that the residual sodium acetate does not affect adversely the thermal stability of hydrolyzed copolymers in molding it, since porosity of the pellets are not so high. Moreover, there is room for improvement from the point of the productivity, for instance, since it takes a long time to wash the pellets, the rate of desalting is slow, it takes a long time to dry the washed pellets, and the like.

(2) The residence time of the strands in coagulating liquids is long and the requirements for apparatus becomes large, since the coagulating rate of the strands extruded into coagulating liquids is slow.

(3) When the strands are cut into pellets, the form of the obtained pellets is non-uniform or the pellets are deformed, since the coagulated strands are not sufficient in hardness.

An object of the present invention is to provide a process for preparing pellets of hydrolyzed ethylene-vinyl acetate copolymers solving the above-mentioned defects.

The above and other objects of the present invention will become apparent from the description hereinafter.

SUMMARY OF THE INVENTION

In accordance with the present invention, there is provided a process for preparing pellets of a hydrolyzed ethylene-vinyl acetate copolymer which comprises extruding a solution of a hydrolyzed ethylene-vinyl acetate copolymer in methanol or a mixture of water and methanol into a coagulating liquid in the form of a strand, and cutting the strand into pellets, said coagulating liquid consisting essentially of an organic solvent having a boiling point of not more than 100° C., and being compatible with methanol but not being capable of dissolving said hydrolyzed ethylene-vinyl acetate copolymer.

DETAILED DESCRIPTION

In the present invention, there is used hydrolyzed ethylene-vinyl acetate copolymers having an ethylene content of 20 to 60% by mole, preferably from 25 to 55% by mole, and having a degree of hydrolysis in vinyl acetate component of not less than 90% by mole, preferably not less than 95% by mole. When the ethylene content is less than 20% by mole, the oxygen-barrier property in high humidity decreases. On the other hand, when the ethylene content is more than 60% by mole, physical properties such as oxygen-barrier property and printability decrease. When the degree of hydrolysis is less than 90% by mole, oxygen-barrier property and moisture resistance decrease.

The hydrolyzed copolymers may include comonomers as a copolymerizable components. Examples of the comonomers are, for instance, α-olefins such as propylene, isobutene, α-octene, α-dodecene and α-octadecene, unsaturated carboxylic acids, the salts thereof, partially or completely alkylated esters, nitriles, amides, anhydrides, unsaturated sulfonic acids, the salts thereof, and the like. The amound of the comonomer is from 0.1 to 10% by mole, preferably from 0.5 to 5% by mole.

The hydrolyzed copolymers are dissolved in methanol or the mixture of water and methanol, and the solutions are extruded into coagulating liquids.

The hydrolyzed copolymers are generally prepared by hydrolyzing the ethylene-vinyl acetate copolymers with alkali catalysts in methanol and newtralizing them. The obtained hydrolysis reaction mixtures which are the methanol solutions of the hydrolyzed copolymers can be used for extruding the strands. When the hydrolysis reaction mixtures are used in the form of methanol solutions for preparation of strands, the hydrolysis reaction mixtures as they are, or suitably concentrated or diluted are used. When the hydrolysis reaction mixtures are used in the form of water/methanol solutions for preparation of strands, the solutions to be extruded are prepared by directly adding water to the hydrolysis reaction mixtures or to the hydrolysis reaction mixtures suitably concentrated or diluted.

The concentration of the hydrolyzed ethylene-vinyl acetate copolymers in the solutions to be extruded is not particularly limited unless the hydrolyzed copolymers are deposited at the temperature that the solutions have, and the concentration is generally from 10 to 50% by weight, preferably from 15 to 45% by weight. When the concentration is so low, it is hard to coagulate the solutions in the coagulating liquids, and on the other hand, when the concentration is so high, the porosity of the pellets decreases. The effects of the present invention can be surely obtained even if methanol is used alone as the solvent of the solutions to be extruded, but the mixed solvent of water and methanol is preferable from the point of stability of the solutions. It is preferable that the weight ratio of water and methanol in the mixed solvent is from 1:9 to 7:3, preferably from 2:8 to 6:4. When the ratio of water to methanol is less than 1/9, the solutions are unstable and the porosity decreases in coagulating the strands, and on the other hand, when the ratio is more than 7/3, the solutions to be extruded are unstable and the hydrolyzed copolymers may be deposited before extruding into coagulating liquids.

In the present invention, it is essential to use organic solvents having a boiling point of not more than 100° C., and being compatible with methanol but not being capable of dissolving the hydrolyzed copolymers as the coagulating liquids. By using such organic solvents, not only the pellets having a remarkably improved porosity, that is, the pellets from which sodium acetate can be efficiently removed, and having high hardness can be prepared, but also troubles such as the loss of resin do not entirely occur.

Examples of the organic solvents are, for instance, aromatic hydrocarbons such as benzene, ketones such as acetone and methyl ethyl ketone, ethers such as dipropyl ether, organic acid esters such as methyl acetate, ethyl acetate and methyl propionate, and the like. Among them, methyl acetate is the most preferable. The solvents may be used alone or in admixture thereof.

The solutions of the hydrolyzed copolymers are extruded into the coagulating liquids at −10° to 40° C., preferably from 0° to 30° C. The hydrolyzed ethylene-vinyl acetate copolymers are not dissolved in the organic solvents used as the coagulating liquids since the organic solvents are non-solvents of the hydrolyzed copolymers. Accordingly, the loss of resin scarcely occurs due to dissolving the hydrolyzed copolymers in the coagulating liquids, but it is preferable that the extrusion is carried out at low temperature. The coagulating liquids may include water or organic solvents other than the solvents specified in the present invention in a small amount as occasion demands.

Methanol and water are gradually accumulated in the coagulating liquids with continuing the coagulation of the strands. When the coagulating effect lowers, methanol and water are separated by distillation.

The solutions of the hydrolyzed ethylene-vinyl acetate copolymers in methanol or the mixture of water and methanol are extruded through holes of a nozzle or die into the coagulating liquids in the form of strands. The form of the holes is not limited, and is generally circular. It is preferable that the diameter of the holes is from about 2 to about 5 mm. It is not necessary that the solutions of the hydrolyzed copolymers is extruded into a single strand. It is possible to extrude into the any number of strands within the range of several strands to several hundreds strands.

The solutions are extruded in the form of the strand and the strands are cut into pellets after they are thoroughly coagulated. In the pelletization, the strands are cut by using a fixed blade or a rotary knife.

The strands can be pelletized in any methods such as (1) a method in which after taking out the strands from the coagulating liquids, the strands are thoroughly washed with water and then are cut, (2) a method in which after cutting the strands taken out from the coagulating liquids, the obtained pellets are washed with water, (3) a method in which after cutting the strands in the coagulating liquids, the obtained pellets are taken out from the liquids and washed with water.

The form of the pellets depends on the pelletizing methods (1) to (3), and in the methods (1) and (2), the pellets have the form of a cylinder and in the method (3), they have the form of a sphere. It is preferable that the cylindrical pellets have a diameter of about 2 to about 5 mm and a length of about 2 to about 5 mm, and the spheric pellets have a diameter of about 2 to about 5 mm, from the point of workability or handling upon molding.

The obtained pellets are subjected to any after-treatment such as an acid-treatment as occasion demands, and dried.

In the pellets of the hydrolyzed copolymers prepared according to the present invention, the porosity is excellent, desalting of sodium acetate and drying of the pellets are efficiently carried out, the thermal stability in melt-molding pellets is improved, and the thermal coloration does not entirely occur. Accordingly, the pellets are molded into any forms such as films, sheets, fibers and containers, and the molded articles are useful for packaging any materials such a foods, medicines and industrial chemicals.

The present invention is more specifically described and explained by means of the following Examples in which all per cents and parts are by weight unless otherwise noted. It is to be understood that the present invention is not limited to the Examples, and various changes and modifications may be made in the invention without departing from the spirit and scope thereof.

EXAMPLE 1

A pressure reactor was charged with 1,000 parts of 40% methanol solution of ethylene-vinyl acetate copolymer having an ethylene content of 30% by mole, and heated to 110° C. under stirring. The hydrolysis reaction was carried out for 2.5 hours by continuously adding 40 parts of 4% methanol solution of sodium hydroxide over 2 hours and 2,500 parts of methanol over 2.5 hours to the pressure reactor under removing methyl acetate produced as a by-product and excess methanol from the reaction system to give a hydrolyzed ethylene-vinyl acetate copolymer having a degree of hydrolysis in vinyl acetate component of 99.0% by mole.

After completing the hydrolysis reaction, the pressure reactor was charged with 450 parts of 50% aqueous solution of methanol under distilling away excess methanol, and a mixed solution of water and methanol (water: methanol=5.8:4.2) having a resin content of 38% was obtained.

The obtained solution of hydrolyzed ethylene-vinyl acetate copolymer in the mixture of water and methanol having a temperature of 50° C. was extruded through a nozzle (hole diameter : 4 mm) at a rate of 1.5 liters/hour into a coagulating bath of methyl acetate (width: 100 mm, length: 4,000 mm, height: 100 mm) maintained at a temperature of 10° C. in the form of strands. After completing the coagulation, adhereing methyl acetate was removed from the strands with showering water, the strands were passed through a wind-up roller (line speed: 2 m/minute) equipped at the end portion of the coagulating bath, were cut by a cutter to prepare white porous pellets having a diameter of 4 mm and a length of 4 mm.

The coagulating liquid was not quite turbid and the loss of resin was not more than 0.1%.

There were added 100 parts of the obtained pellets to 300 parts of water having a temperature of 30° C. and the mixture was stirred for 1 hour to remove sodium acetate from the pellets. The desalting of sodium acetate was carried out three times.

The content of sodium acetate in hydrolyzed copolymer was determined. The results are shown in Table 1.

COMPARATIVE EXAMPLE 1

The procedure of Example 1 was repeated except that water was used as the coagulating liquid instead of methyl acetate.

The results are shown in Table 1.

In order to lower the content of sodium acetate to the same content as in Example 1, the desalting must be carried out five times.

EXAMPLES 2 TO 5

The procedure of Example 1 was repeated except tha ethyl acetate (Example 2), acetone (Example 3), methyl ethyl ketone (Example 4) or dipropyl ether (Example 5) was used as the coagulating liquid instead of methyl acetate.

The results are shown in Table 1.

EXAMPLES 6 AND 7

The procedure of Example 1 was repeated except that a hydrolyzed ethylene-vinyl acetate copolymer having an ethylene content of 38% by mole and a degree of hydrolysis of 99.1% by mole (Example 6), or a hydrolyzed ethylene-vinyl acetate copolymer having an ethylene content of 45% by mole and a degree of hydrolysis of 99.1% by mole was used.

The results are shown in Table 1.

EXAMPLES 8 AND 9

The procedure of Example 1 was repeated except that a proportion of water and methanol in the solution of the hydrolyzed copolymer was changed to 5:5 (Example 8), or changed to 7:3 (Example 9).

The results are shown in Table 1.

EXAMPLE 10

The procedure of Example 1 was repeated except that a solution of the hydrolyzed ethylene-vinyl acetate copolymer in methanol was used instead of the solution of the hydrolyzed copolymer in the mixture of water and methanol.

The results are shown in Table 1.

TABLE 1

|  | Content of sodium acetate (%) | | Required time for hardening of strands (second) | Breaking of strands*1 (times/10 strands) | Volatile*2 matter (%) |
| --- | --- | --- | --- | --- | --- |
|  | Before desalting | After desalting the pellets three times |  |  |  |
| Ex. 1 | 1.06 | 0.24 | from 50 to 60 | 0 | 0.2 |
| Ex. 2 | 1.07 | 0.25 | from 50 to 60 | 0 | — |
| Ex. 3 | 1.06 | 0.25 | from 60 to 70 | 0 | — |
| Ex. 4 | 1.08 | 0.26 | from 70 to 80 | 0 | — |
| Ex. 5 | 1.18 | 0.26 | from 70 to 80 | 0 | — |
| Ex. 6 | 1.27 | 0.26 | from 60 to 70 | 0 | — |
| Ex. 7 | 0.98 | 0.26 | from 55 to 65 | 0 | — |
| Ex. 8 | 1.12 | 0.25 | from 50 to 60 | 0 | — |
| Ex. 9 | 1.10 | 0.26 | from 60 to 70 | 0 | — |
| Ex. 10 | 1.12 | 0.25 | from 30 to 40 | 1 | — |
| Com. Ex. 1 | 1.27 | 0.35 | from 110 to 120 | 5 | 0.4 |

(Notes)
*1Breaking of strands shows how many times the strands are broken off during extruding 10 strands for 36 hours.
*2Volatile matter is determined by the weight loss of the sample at 150° C. for 5 hours. The sample is the pellets subjected to fluidized drying at 100° C. for 20 hours.

In the present invention, by extruding the hydrolyzed ethylene-vinyl acetate copolymers into the coagulating liquids comprising the specific organic solvents in the form of the strand, the following excellent effects can be obtained.

That is, the strands having fast coagulating rate and high hardness can be obtained, the pellets having high porosity and accordingly being sufficient in porosity can be obtained, sodium acetate contained in the hydrolyzed copolymers as the impurity can be effectively removed by washing the pellets with water, the drying time of the pellets can be shortened, the form of the pellets is uniform and the pellets are excellent in thermal stability.

What we claim is:

1. A process for preparing pellets of a hydrolyzed ethylene-vinyl acetate copolymer having an ethylene content of 20 to 60% by mole and having a degree of hydrolysis in vinyl acetate component of not less than 90% by mole, which comprises extruding a solution of said hydrolyzed ethylene-vinyl acetate copolymer in methanol or a mixture of water and methanol into a coagulating liquid in the form of a strand, a weight ratio of water and methanol in said mixture being from 1:9 to 7:3, and cutting said strand into pellets, said solution having a concentration of said hydrolyzed ethylene-vinyl acetate copolymer of 10 to 50% by weight and said coagulating liquid consisting essentially of at least one organic solvent selected from the group consisting of benzene, dipropyl ether, methyl acetate, ethyl acetate and methylpropionate.

2. The process of claim 1, wherein said organic solvent is methyl acetate.

3. The process of claim 1, wherein said solution has a concentration of said hydrolyzed ethylene-vinyl acetate copolymer of 15 to 45% by weight.

4. The process of claim 1, wherein a weight ratio of water and methanol in said mixture is from 2:8 to 6:4.

* * * * *